(12) United States Patent
Ono et al.

(10) Patent No.: US 11,875,192 B2
(45) Date of Patent: Jan. 16, 2024

(54) CLUSTERING SYSTEM AND CLUSTERING METHOD FOR PROVIDING SERVICES USING MULTI-ACCESS EDGE COMPUTING SERVERS

(71) Applicant: Nippon Telegraph and Telephone Corporation, Tokyo (JP)

(72) Inventors: Kotaro Ono, Tokyo (JP); Naoki Higo, Tokyo (JP); Takuma Tsubaki, Tokyo (JP); Yusuke Urata, Tokyo (JP); Ryota Ishibashi, Tokyo (JP); Kenta Kawakami, Tokyo (JP); Takeshi Kuwahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 202 days.

(21) Appl. No.: 17/424,242

(22) PCT Filed: Jan. 16, 2020

(86) PCT No.: PCT/JP2020/001136
§ 371 (c)(1),
(2) Date: Jul. 20, 2021

(87) PCT Pub. No.: WO2020/158395
PCT Pub. Date: Aug. 6, 2020

(65) Prior Publication Data
US 2022/0114029 A1    Apr. 14, 2022

(30) Foreign Application Priority Data
Jan. 30, 2019    (JP) .................. 2019-014082

(51) Int. Cl.
*G06F 9/50*    (2006.01)
*G06F 11/30*    (2006.01)

(52) U.S. Cl.
CPC .......... *G06F 9/5072* (2013.01); *G06F 9/5055* (2013.01); *G06F 9/5077* (2013.01);
(Continued)

(58) Field of Classification Search
None
See application file for complete search history.

(56) References Cited

U.S. PATENT DOCUMENTS

2002/0152305 A1* 10/2002 Jackson .................. H04L 43/00
709/224
2014/0019619 A1* 1/2014 Senarath ............... H04W 40/24
709/226
(Continued)

FOREIGN PATENT DOCUMENTS

JP    2017079062    4/2017

OTHER PUBLICATIONS

J. Oueis, E. C. Strinati and S. Barbarossa, "Distributed mobile cloud computing: A multi-user clustering solution," 2016 IEEE International Conference on Communications (ICC), Kuala Lumpur, Malaysia, 2016, pp. 1-6, doi: 10.1109/ICC.2016.7511046. (Year: 2016).*

(Continued)

*Primary Examiner* — Abu Zar Ghaffari
(74) *Attorney, Agent, or Firm* — Fish & Richardson P.C.

(57) ABSTRACT

A system and method capable of efficiently using and operating resources and allowing a cluster satisfying requirements of functions/services provided to terminals to be configured of multi-access edge computing (MEC) servers are provided. A clustering system 100 includes a monitoring unit 110 configured to monitor a usage status of MEC
(Continued)

servers and a network and store telemetry information in a storage unit 120, a cluster planning request unit 130 configured to acquire non-telemetry information such as provision area information and requirement information of functions/services and deployment information of the MEC server, store the non-telemetry information in the storage unit 120, a cluster planning unit 140 configured to set a virtual region including one or more bases satisfying a provision area and requirements on the basis of each piece of information in the storage unit 120 and calculate a cluster plan for providing the functions/services from a plurality of MEC servers disposed at the base belonging to the virtual region, and a cluster construction unit 150 configured to perform a clustering process on the basis of the cluster plan.

8 Claims, 8 Drawing Sheets

(52) U.S. Cl.
CPC .... *G06F 11/3006* (2013.01); *G06F 2209/501* (2013.01); *G06F 2209/505* (2013.01); *G06F 2209/508* (2013.01)

(56) References Cited

U.S. PATENT DOCUMENTS

| | | | |
|---|---|---|---|
| 2016/0117602 A1* | 4/2016 | Hassanzadeh | G06F 16/285 706/11 |
| 2016/0179583 A1* | 6/2016 | Eide | G06F 9/5077 713/320 |
| 2018/0246768 A1 | 8/2018 | Palermo et al. | |
| 2018/0287902 A1* | 10/2018 | Chitalia | G06F 21/41 |
| 2019/0132197 A1* | 5/2019 | Saxena | H04L 41/0895 |
| 2019/0140933 A1* | 5/2019 | Guim Bernat | H04L 47/2425 |
| 2019/0158300 A1* | 5/2019 | Sabella | H04M 15/8353 |
| 2020/0104184 A1* | 4/2020 | Subramanian | G06N 3/04 |

OTHER PUBLICATIONS hpe.com, "HA cluster textbook," retrieved on Dec. 28, 2018, retrieved from <https://h50146.www5.hpe.com/products/software/OE/hpux/developer/column/sg_text.pdf>, 105 pages (With English Translation).

Kekki et al., "MEC in 5G Networks," ETSI White Paper No. 28 (First Edition), Jun. 2018, retrieved from <https://www.etsi.org/images/files/ETSIWhitePapers/etsi_wp28_mec_in_5G_FINAL.pdf>, pp. 1-28.

* cited by examiner

CLUSTERING SYSTEM AND CLUSTERING METHOD FOR PROVIDING SERVICES USING MULTI-ACCESS EDGE COMPUTING SERVERS

CROSS-REFERENCE TO RELATED APPLICATIONS

This application is a National Stage application under 35 U.S.C. § 371 of International Application No. PCT/JP2020/001136, having an International Filing Date of Jan. 16, 2020, which claims priority to Japanese Application Serial No. 2019-014082, filed on Jan. 30, 2019. The disclosure of the prior application is considered part of the disclosure of this application, and is incorporated in its entirety into this application.

TECHNICAL FIELD

The present invention relates to a clustering system and a method for configuring a cluster for providing functions/services to a terminal by a plurality of MEC servers in a network in which MEC servers are deployed.

BACKGROUND ART

Multi-access edge computing (MEC) meant a mechanism in which a server is deployed in an "edge" such as a base station near a terminal in a network (NW) such as a mobile communication network that accommodates the terminal in the related art. However, a technical idea of disposing a server near a terminal is not limited to a mobile communication network, and can be applied to an NW such as a fixed communication network and can also be applied to an NW including a plurality of types of access means accommodating terminals. Further, an idea of "edge" can be said to be a server close to a terminal when the server is a server deployed in an NW with reference to the Internet in which a cloud server is deployed. Therefore, in recent years, the MEC means a mechanism that provides various services or functions to a terminal using a server deployed in an NW between a cloud server and the terminal, in other words, an NW between the Internet and the terminal regardless of the type or the number of access means such as a mobile communication network or a fixed communication network. NPL 1 describes the MEC in the 5th Generation (5G).

Thus, in MEC in which a server that processes information is deployed near the terminal on the NW between a cloud server and the terminal, various functions or processing realized on the cloud server side or the terminal side in the related art can be distributed by using MEC servers that are deployed by being physically and geographically distributed. Accordingly, support for services in new areas such as services requiring low delay or services requiring aggregation of a large amount of information and high speed processing is being studied.

Various NW configurations including MEC servers can be considered but, in the present application, an environment in which MEC servers deployed between a cloud server 21 on the Internet 20 and a terminal 1 have a hierarchical structure according to an area division as illustrated in FIG. 1 is assumed. Here, the MEC server means a physical server deployed at a base such as a data center or a base station in an NW 10 of a business operator accommodating the terminal 1, such as a mobile communication network or a fixed communication network. One or more MEC servers are deployed at respective bases. Since a plurality of MEC servers are often deployed at one base, the plurality of MEC servers deployed at each base are referred to as an MEC server group 11 in FIG. 1. The MEC server groups 11 are deployed at geographically different bases, and a network topology between the bases geographically includes a hierarchical structure. In FIG. 1, an example in which bases at which the MEC server groups 11 are deployed have a tree structure as an example of the hierarchical structure is illustrated.

On the other hand, an example of a countermeasure for preventing provision of functions/services from being interrupted even at the time of a sudden occurrence of abnormality can include redundancy of a system. One example of a method of redundancy as a countermeasure against a failure of a server or the like includes a cluster configuration with a plurality of servers (see NPL 2). When functions/services are provided by clustered servers, even in a case in which an abnormality occurs in an active server in the cluster, switching to a standby server can be performed and processing can be taken over for continued provision of the functions/services.

Therefore, it is conceivable that a cluster that provides the functions/services provided to the terminal 1 be configured of (clusters) MEC servers.

CITATION LIST

Non Patent Literature

[NPL 1] "MEC in 5G networks", First edition, ETSI White Paper No. 28, ISBN No. 979-10-92620-22-1, European Telecommunications Standards Institute, June 2018, [online], [Retrieved on Dec. 28, 2018], Internet

[NPL 2] "HA Cluster no Kyoukasyo (HA Cluster Textbook)", Hewlett-Packard Japan, [online], [Retrieved on Dec. 28, 2018], Internet <URL:httpth50146.www5.hpe.com/products/software/oe/hpux/developer/column/sg_text.pdf>

SUMMARY OF THE INVENTION

Technical Problem

However, since MEC servers are physically and geographically distributed and deployed, abundant resources are not present in all deployment positions, and it is necessary for an operator of MEC server groups or an NW connected to the MEC server groups to efficiently use limited resources while causing requirements of functions/services to be satisfied. The functions/services may be provided by the MEC servers satisfying the requirements, but when costs also including resource disposition/usage status and maintenance and operation of the MEC server groups or the NW are considered, the MEC servers which form a cluster of functions/services viewed from the user side vary depending on a situation.

On the other hand, for example, in existing edge/cloud services such as the Amazon web service (AWS), a method of designating an area division and a region of servers clustered at the time of using a function/service is adopted, but it is difficult for the same method to be applied to MEC. That is, in a method in which each function/service provided by the MEC server designates a region independently, functions/services are highly likely not to be able to be used due to lack of resources depending on a relationship between supply and demand unless each of physically and geographically distributed and deployed MEC server groups 11 has abundant resources. That is, it is not possible to efficiently use or operate resources having properties different for each MEC server group 11 such as the MEC server group 11 having a hierarchical structure, and having physical restrictions.

The present invention has been made in view of the above circumstances, and an object of the present invention is to provide a system and method capable of efficiently using and operating resources and allowing a cluster satisfying requirements of functions/services provided to terminals to be configured of MEC servers.

Means for Solving the Problem

In order to achieve the above object, the present invention is a clustering system that configures a cluster for provision of functions/services to a terminal using a plurality of MEC servers in a network in which MEC servers are deployed at each of a plurality of geographically different bases, a network topology between the bases includes a hierarchical structure, and terminals are accommodated, the clustering system including: a monitoring unit configured to monitor a usage status of the MEC servers and the network and store telemetry information including at least status information acquired by the monitoring in a storage unit; a cluster planning request unit configured to acquire non-telemetry information including at least provision area information and requirement information of functions/services and deployment information of the MEC server, store the non-telemetry information in the storage unit, and generate a cluster planning request on the basis of the non-telemetry information; a cluster planning unit configured to set a virtual region including one or more bases satisfying a provision area and requirements of the functions/services on the basis of the telemetry information and the non-telemetry information in the storage unit in response to the cluster planning request, and calculate a cluster plan for providing the functions/services from a plurality of MEC servers deployed at the base belonging to the set virtual region; and a cluster construction unit configured to perform a clustering process on the basis of the cluster plan.

Effects of the Invention

According to the present invention, it is possible to efficiently use or operate resources having properties different for each MEC server group such as an MEC server group having a hierarchical structure, and having physical restrictions while satisfying requirements of functions/services provided to the terminal. Further, by setting the virtual region in consideration of the operator side, it is possible to realize an environment in which functions and services can be used and provided in a state in which requirements are satisfied by simply presenting a provision area and the requirements without specifically designating an area division, a region, and the like of the MEC server to be clustered at the time of use. Further, accumulation of information on area characteristics, a usage status of the MEC server group and the NW, and a cluster planning result can be reflected in not only resource utilization (cluster configuration) at that point in time, and also a future resource plan (scale up/scale out and deployment at a new place of the MEC server group).

DESCRIPTION OF EMBODIMENTS

Figure 1:
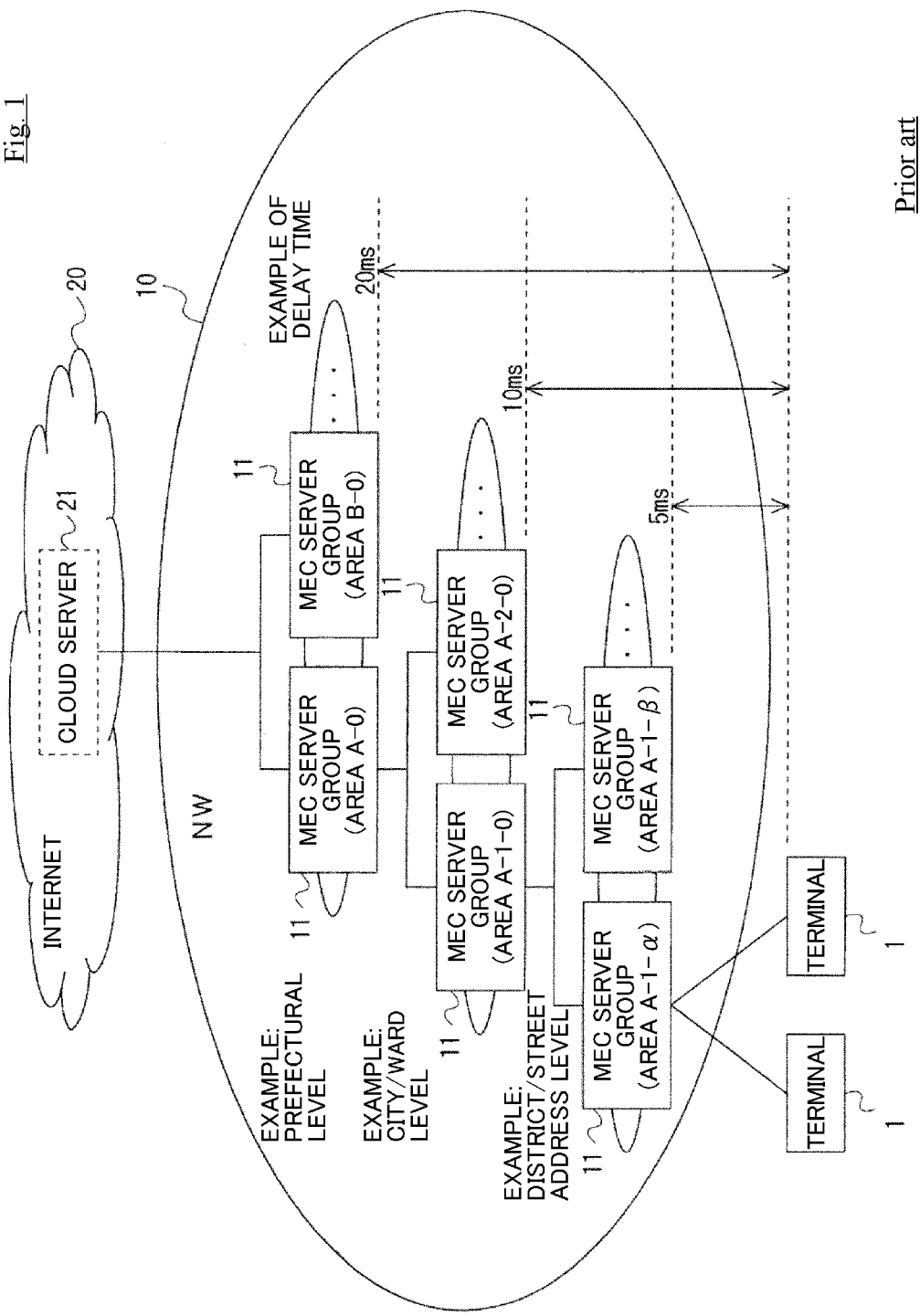
FIG. 1 is a schematic configuration diagram of an environment example that is a premise of the present invention.

First, a concept of the present invention will be described. In the present invention, an environment in which the MEC server group 11 in the NW 10 as illustrated in FIG. 1 has a tree structure according to area division, as described above, is assumed. It is to be noted that the Internet or a cloud server in FIG. 1 is not included as components of the present invention.

Further, in the present invention, a business model, so-called BtoBtoX, in which a person who provides a cluster environment using an operation of the NW 10 and the MEC server group 11, a person who provides a function/service using the cluster environment, and a person (a user of the terminal 1) who receives the function/service appear is assumed. In the present application, for convenience of description, the person who provides the cluster environment using the operation of the NW 10 and the MEC server group 11 is called "operator", and the person who provides the function/service using the cluster environment is called "function/service provider". It is to be noted that the operator and the function/service provider do not necessarily have to be different persons.

The system according to the present invention is a system that configures (clusters) a cluster of functions/services that are provided to the terminal 1, using the MEC server, in consideration of costs including resource disposition/usage status and maintenance and operation of the MEC server group 11 or the NW 10, in addition to requirements of the functions/services provided to the terminal 1, and updates the cluster as necessary.

Here, since the MEC server group 11 to be incorporated into a cluster configuration of a specific function/service, and the region vary depending on the costs including resource disposition/usage status and maintenance and operation of the MEC server group 11 or the NW 10, a "virtual region (vR)" set from functions/service requirements to be satisfied, and the costs including resource disposition/usage status and maintenance and operation of the MEC server group 11 or the NW 10 is defined in the present invention.

Functions/services using MEC servers present a provision range (a provision area) and requirements to be satisfied, and an operator who receives this presentation configures (clusters) a cluster that provides functions/services from the MEC server groups 11 belonging to a virtual region vR. Resources to be secured (necessity of a graphics processing unit (GPU), a central processing unit (CPU) to be secured, an NW bandwidth, and the like) or conditions to be secured (a degree of redundancy or a delay time) are assumed to be the requirements.

Further, it is necessary to consider a topology of the NW 10 connecting the MEC server groups 11 to each other in each of a U plane/C plane/M plane in order to define and operate the virtual region vR, but an environment of a hierarchical structure (tree structure) illustrated in FIG. 1 described above is assumed here. Of course, when a hierarchical structure is included according to requirements of the operator side including MEC-specific function/service characteristics or costs, an NW topology having a different mesh structure or the like may be assumed, or an environment in which network functions are also virtualized and then the NW topology is changed as necessary may be assumed.

Figure 2:
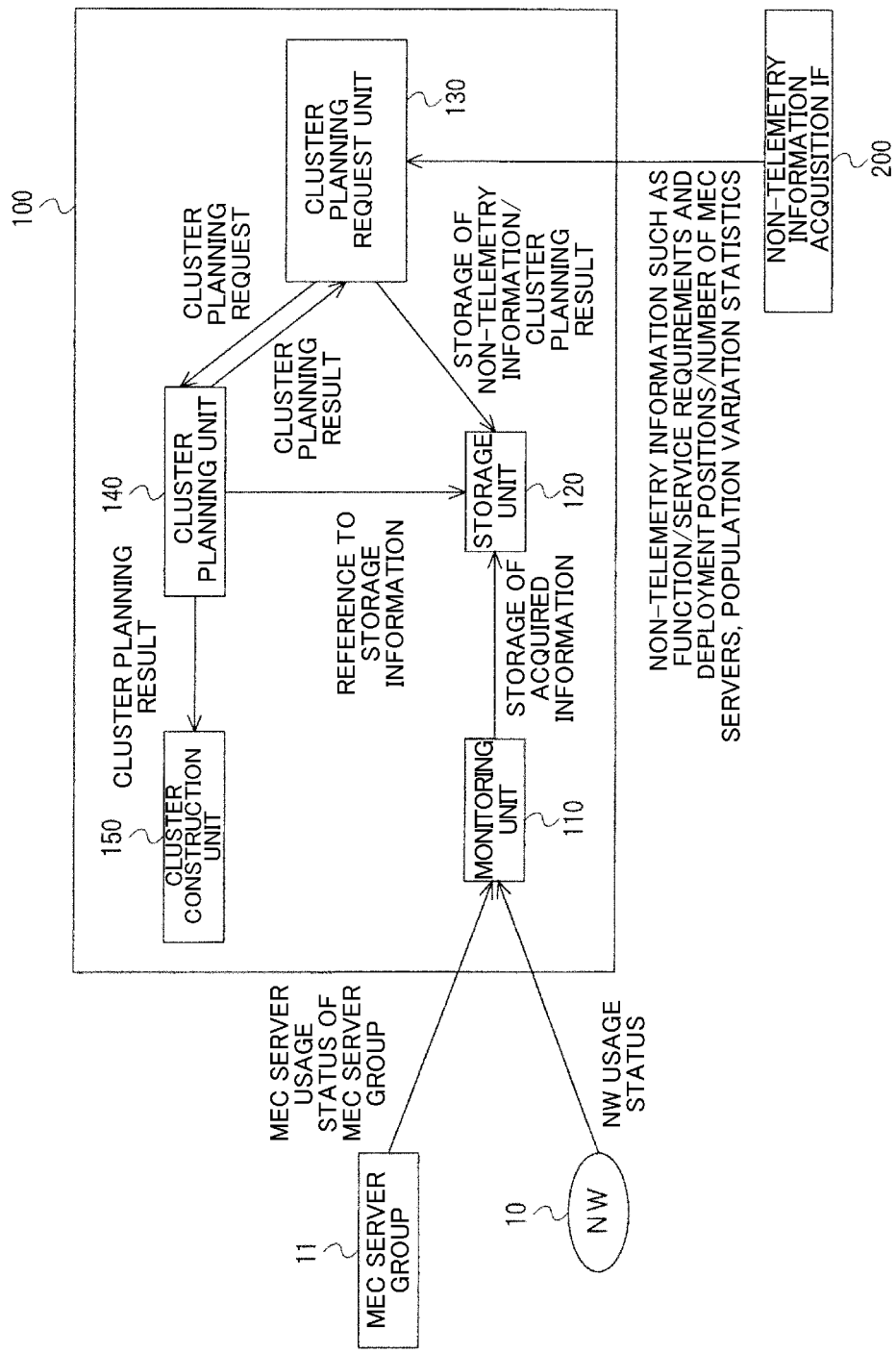
FIG. 2 is a functional block diagram of a clustering system according to the present invention.
Figure 3:
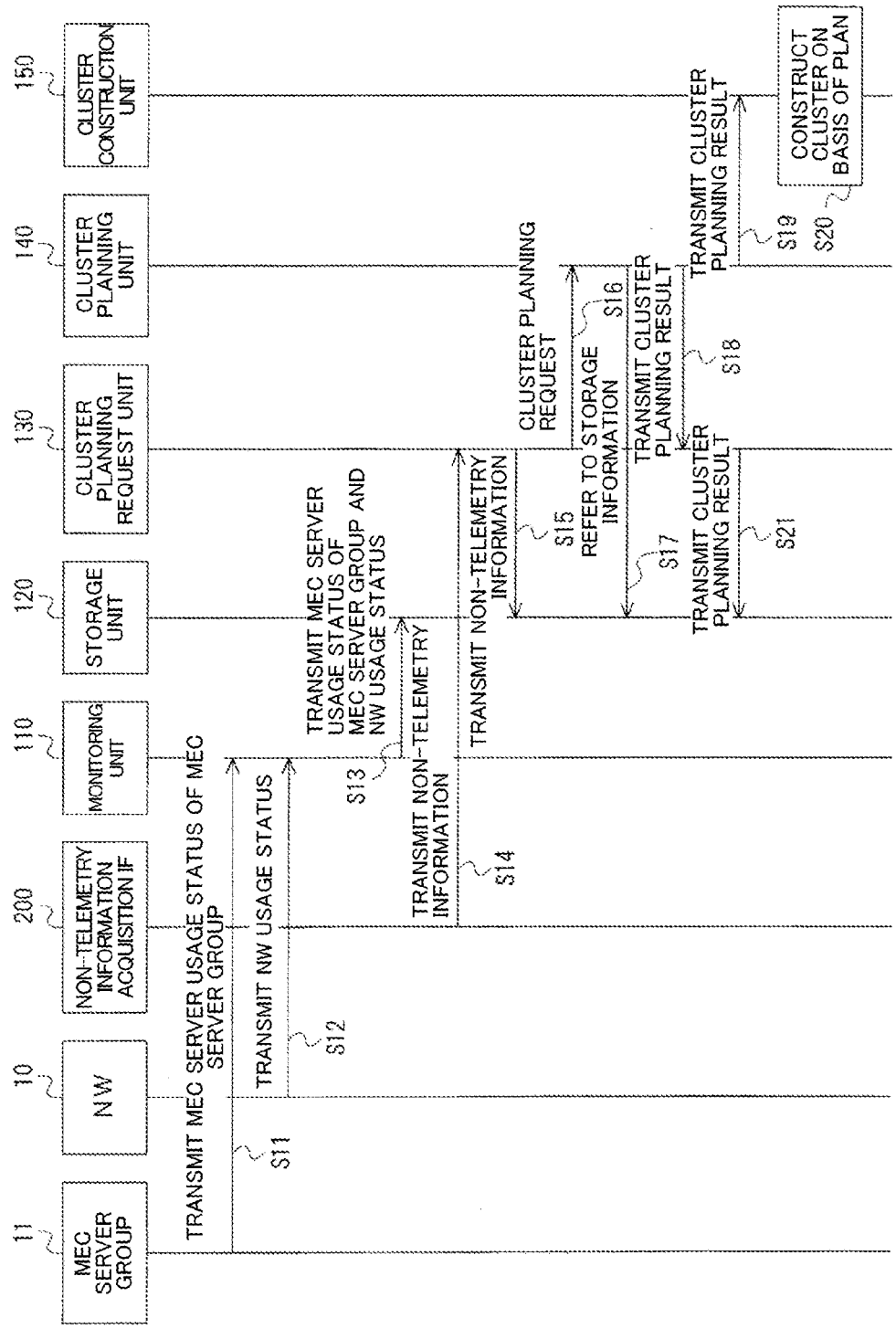
FIG. 3 is a clustering sequence chart according to the present invention.
Figure 4:
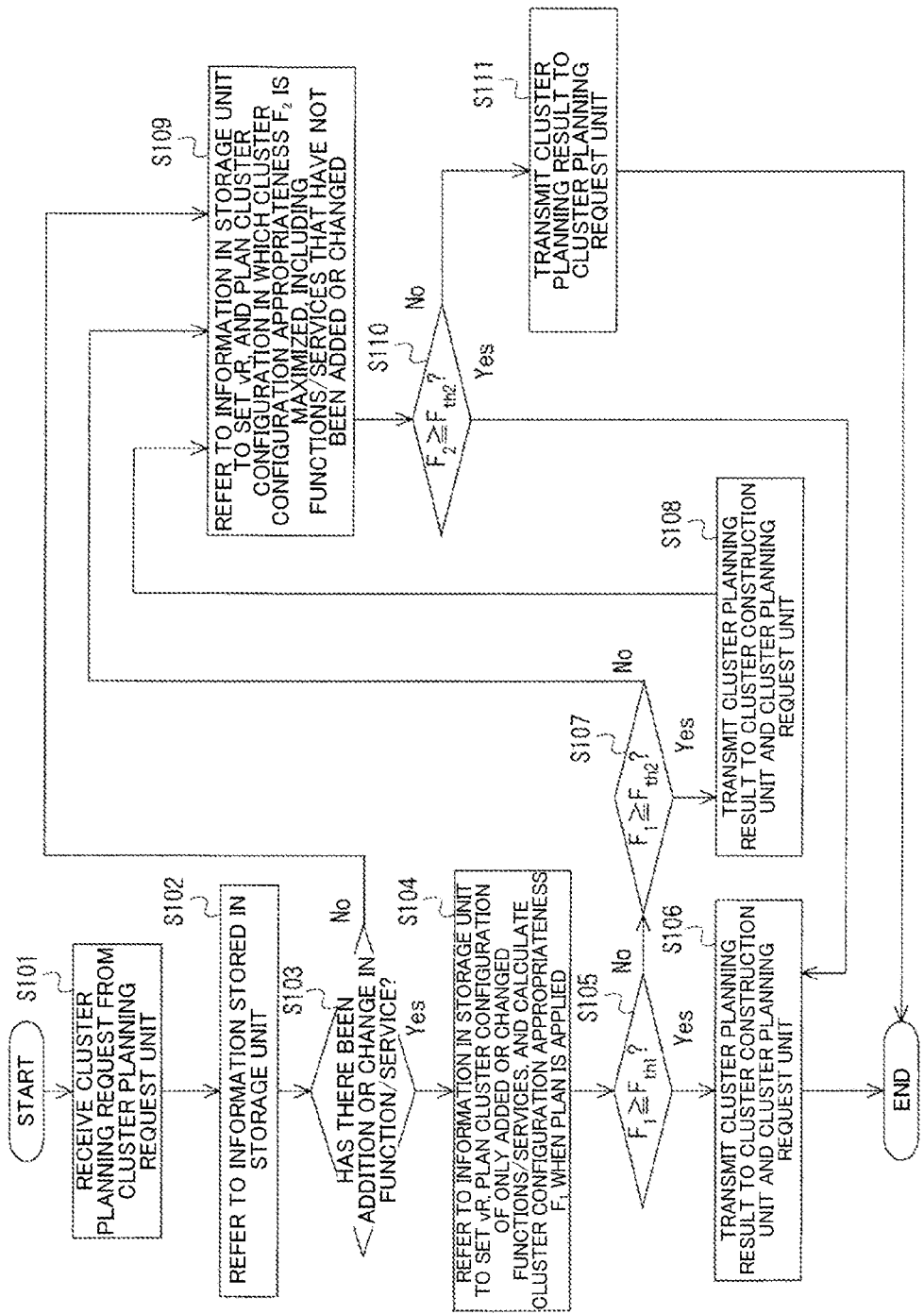
FIG. 4 is a flowchart of a cluster planning unit according to the present invention.

Next, a clustering system according to the present invention will be described with reference to FIGS. 2 to 4. FIG. 2 is a functional block diagram of the clustering system according to the present invention, FIG. 3 is a clustering sequence chart, and FIG. 4 is a flowchart of a cluster planning unit (to be described below).

As illustrated in FIG. 2, a clustering system 100 includes a monitoring unit 110, a storage unit 120, a cluster planning request unit 130, a cluster planning unit 140, and a cluster construction unit 150. A mounting form of the clustering system 100 does not matter. For example, each unit of the clustering system 100 may be mounted as a dedicated device, a program may be installed and mounted in a general-purpose device or a virtual environment, or a program may be installed and mounted in various devices constituting the NW 10. Further, the clustering system 100 may be centrally mounted in one device or virtualization environment or may be distributed by being mounted in a plurality of devices or virtualization environments.

Hereinafter, details of functions and operations of respective units of the clustering system 100 according to the present invention will be described with reference to FIGS. 2 to 4.

The storage unit 120 stores various types of information from the monitoring unit 110 and the cluster planning request unit 130 as will be described below. The information stored in the storage unit 120 is roughly classified into telemetry information acquired by the monitoring unit 110 and non-telemetry information acquired by the cluster planning request unit 130. Details of the telemetry information and the non-telemetry information will be described below.

The monitoring unit 110 monitors a usage status of the MEC server constituting the MEC server group 11 deployed at each base and the NW 10, and stores acquired information on the usage status as telemetry information in the storage unit 120 (steps S11 to S13 in FIG. 3). Various known methods of the related art can be used as a method of acquiring information from each MEC server and a method of acquiring information from the NW 10.

Non-telemetry information regarding provision areas and requirements of clustered functions/services or functions/services required to be clustered in the future, and deployment position/number of MEC servers is transmitted to the cluster planning request unit 130 via a non-telemetry information acquisition IF 200, which is an information acquisition interface such as a graphical user interface (GUI) or a character user interface (CUI) (step S14 in FIG. 3). Non-telemetry information to be transmitted may include information on area characteristics, such as a function/service provision status in each time period/time point, area-specific population variation statistics, or variation statistics of the number of terminals that are in the area or are connected. Further, the non-telemetry information to be transmitted may be input by the operator, the function/service provider, or both via the non-telemetry information acquisition IF 200.

The cluster planning request unit 130 stores the acquired information in the storage unit 120 (step S15 in FIG. 3), and at the same time, transmits a cluster planning request to the cluster planning unit 140 at the time of new generation of a function/service required to be clustered, change in requirements of a clustered function/service, or change in a deployment position/number of the MEC servers (step S16 in FIG. 3).

Then, the cluster planning unit 140 performs a process of making a cluster plan in response to the cluster planning request according to the flowchart of FIG. 4. A main flow of the plan making process includes (a) setting the virtual region vR, (b) making one or more cluster plan proposals using the MEC server group 11 at the base included in the virtual region vR, (c) calculating a cluster configuration appropriateness F which will be described below for each cluster plan proposal, and (d) selecting an appropriate cluster plan on the basis of the calculated cluster configuration appropriateness F. Hereinafter, the class and a process of the planning unit 140 will be described in detail.

When the cluster planning unit 140 receives the cluster planning request from the cluster planning request unit 130 (step S101 in FIG. 4), the cluster planning unit 140 refers to the information stored in the storage unit 120 (step S102 in FIG. 4 and step S17 in FIG. 3) to confirm whether there has been addition or change in the function/service (step S103 in FIG. 4). When there is an addition or change, the cluster planning unit 140 refers to the information in the storage unit 120 to set the virtual region vR, newly plans the cluster configuration of only the added or changed functions/services using the MEC server belonging to the virtual region vR, and calculates a cluster configuration appropriateness $F_1$ when the plan is applied to the MEC server group (step S104 in FIG. 4).

When the cluster configuration appropriateness $F_1$ is equal to or greater than a predetermined default value $F_{th1}$, a cluster planning result is transmitted to the cluster construction unit 150 and the cluster planning request unit 130 (steps S105 to S106 in FIG. 4 and steps S18 and S19 in FIG. 3) and the cluster construction unit 150 performs clustering on the basis of the cluster planning result (step S20 in FIG. 3). The cluster planning request unit 130 stores the received cluster plan in the storage unit 120 (step S21 in FIG. 3).

Here, the cluster configuration appropriateness F is an appropriateness of the cluster configuration for the operator side calculated from the usage status of the MEC server group 11 and the NW 10 in consideration of maintenance and operation costs, and a higher cluster configuration appropriateness F indicates a state in which resources can be used efficiently for the operator side. In the calculation, not only the usage status of the MEC server group 11 and the NW 10 but also costs regarding a maintenance and operation calculated using a deployment position, service life, a time interval until regular maintenance, and the like of the MEC server can be considered. A calculation formula for the cluster configuration appropriateness F, and elements, coefficients, and the like to be included in the calculation can be arbitrarily set according to requirements of the operator side. The default value $F_{th1}$ is a lower limit value of the cluster configuration appropriateness F that can realize efficient use of resources ideal for the operator side, and this can also be arbitrarily set according to various external requirements.

On the other hand, when the cluster configuration appropriateness $F_1$ is smaller than the default value $F_{th1}$, a predetermined lower limit value $F_{th2}$ for efficient use of resources that can be allowed by the operator side is compared with the cluster configuration appropriateness $F_1$ (steps S105 and S107 in FIG. 4). When the cluster configuration appropriateness $F_1$ is equal to or greater than the lower limit value $F_{th2}$, the cluster planning result is transmitted to the cluster construction unit 150 and the cluster planning request unit 130 (steps S107 to S108 in FIG. 4 and steps S18 and S19 in FIG. 3). Then, the information in the storage unit 120 is referred to again, each virtual region vR including the functions/services that have not been added or changed, that is, the functions/services relevant to an existing cluster other than a current cluster planning request is set, and a cluster configuration in which a cluster configuration appropriateness $F_2$ is maximized is planned (step S109 in FIG. 4). On the other hand, when the cluster configuration appropriateness $F_1$ is smaller than the lower limit value $F_{th2}$, clustering is not possible and thus, the processing proceeds to step S109 in FIG. 4 described above (step S107 in FIG. 4).

When the cluster configuration appropriateness $F_2$ is equal to or greater than the lower limit value $F_{th2}$, the cluster planning result is transmitted to the cluster construction unit 150 and the cluster planning request unit 130 (steps S110 and S106 in FIG. 4 and steps S18 and S19 in FIG. 3), and the cluster construction unit 150 performs clustering (again) on the basis of the plan (step S20 in FIG. 3). The cluster planning request unit 130 stores the received cluster plan in the storage unit 120 (step S21 in FIG. 3). On the other hand, when the cluster configuration appropriateness $F_2$ is smaller than the lower limit value $F_{th2}$, clustering is not possible and thus, the cluster planning result is transmitted to the cluster planning request unit 130 and clustering is not executed (steps S110 and S111 in FIG. 4).

When clustering is not possible, functions/services cannot be provided and thus, the operator takes measures through maintenance and operations such as increase in resources. Since a resource status after the measures is stored in the storage unit 120 through the non-telemetry information acquisition IF 200, the cluster planning request unit 130 transmits the cluster planning request to the cluster planning unit 140 again such that functions/services to be provided can be clustered.

When there has been no addition or change in the function/service in step S103 of FIG. 4 described above, the information in the storage unit 120 is referred to again, the virtual region vR including the function/service that has not been added or changed, that is, including functions/services relevant to an existing cluster other than the current cluster planning request is set, and the cluster configuration in which the cluster configuration appropriateness $F_2$ is maximized is planned (step S109 in FIG. 4). When the cluster configuration appropriateness $F_2$ is equal to or greater than the lower limit value $F_{th2}$, the cluster planning result is transmitted to the cluster construction unit 150 and the cluster planning request unit 130 (steps S110 and S106 in FIG. 4 and steps S18 and S19 in FIG. 3), and the cluster construction unit 150 performs clustering (again) on the basis of the plan (step S20 in FIG. 3). The cluster planning request unit 130 stores the received cluster plan in the storage unit 120 (step S21 in FIG. 3). On the other hand, when the cluster configuration appropriateness $F_2$ is smaller than the lower limit value $F_{th2}$, clustering is not possible and thus, the cluster planning result is transmitted to the cluster planning request unit 130 and clustering is not executed (steps S110 and S111 in FIG. 4).

A cluster construction process may be automatically performed by the cluster construction unit 150 using various known methods of the related art on the basis of the cluster plan, or a part of the process may be manually performed by the operator.

Conditions or a frequency of issuance of a cluster planning request, a calculation formula or format of the cluster configuration appropriateness F, a type or degree of a threshold value set as the default value $F_{th1}$ or the lower limit value $F_{th2}$, and a numerical scale or scope of a cluster configuration plan considered in order to calculate a maximum value of the cluster configuration appropriateness F, and the like can be specified separately as necessary.

According to such a clustering system 100, it is possible to efficiently use or operate resources having properties different for each MEC server group 11 such as the MEC server group 11 having a hierarchical structure, and having physical restrictions while satisfying requirements of functions/services provided to the terminal 1.

Further, by setting the virtual region vR in consideration of the operator side, it is possible to realize an environment in which functions and services can be used and provided in a state in which the requirements are satisfied by the function/service provider simply presenting the provision area and requirements without specifically designating an area division and a region of the MEC server to be clustered.

Further, accumulation of the information on area characteristics, the usage status of the MEC server group 11 and the NW 10, and the cluster planning result can be reflected in not only resource utilization (cluster configuration) at that point in time, and also a future resource plan (scale up/scale out and deployment at a new place of the MEC server group 11).

Example 1

Figure 5:
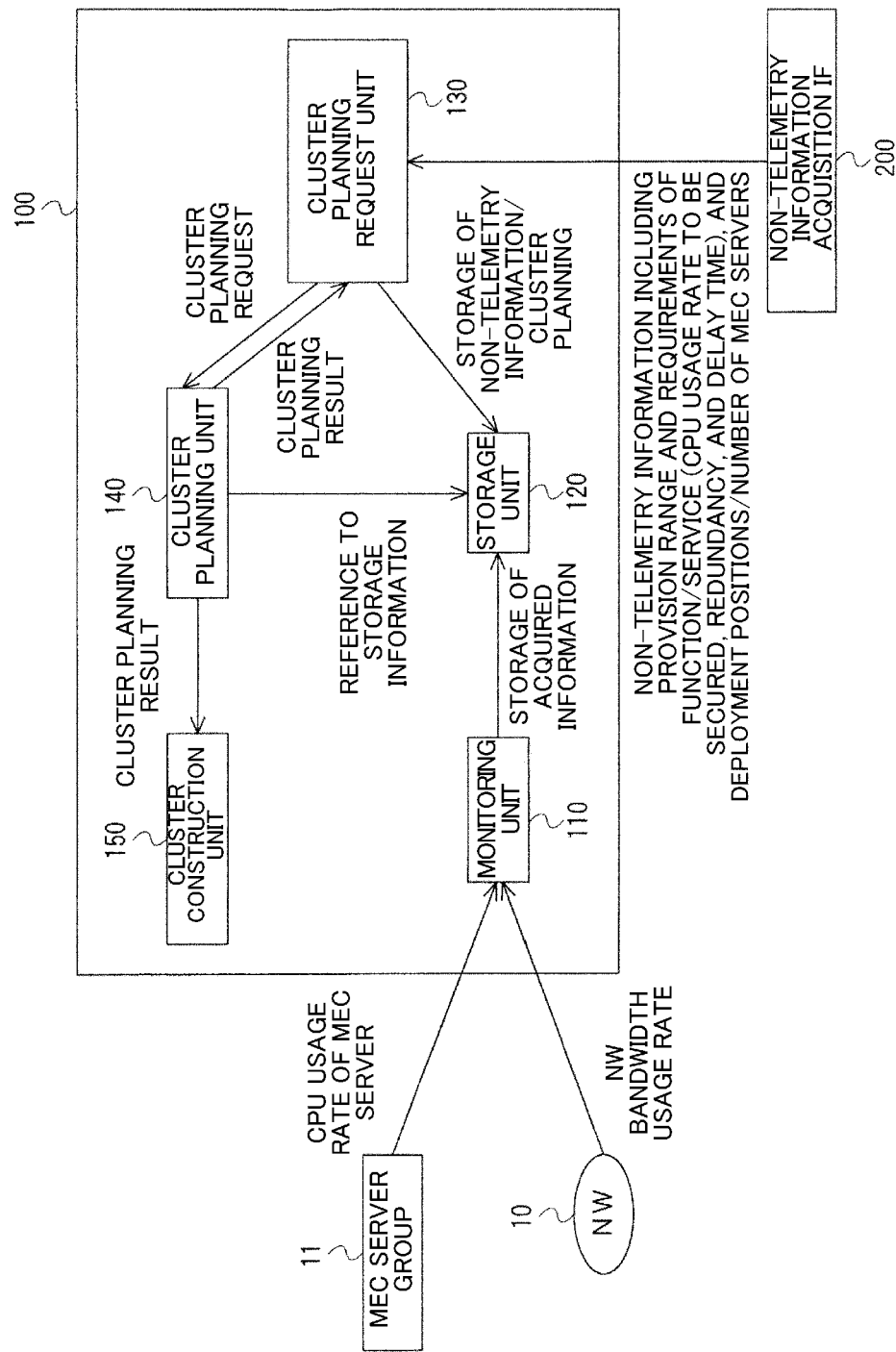
FIG. 5 is a functional block diagram of a clustering system according to Example 1.

Next, Example 1 of the present invention will be described with reference to FIGS. 5 to 7. In Example 1, an example in which a cluster of service A (providing range: area A-1-α, CPU usage rate to be secured: 200%, redundancy: double, and delay time: 15 ms) is configured in the environment illustrated in FIG. 1 is shown.

Here, the total number of CPUs disposed in an area A-1-0 is 1600%, and the total number of CPUs disposed in the area A-1-α is 800%. An NW bandwidth used when service A is provided in the area A-1-α is 10 Gbps, an NW bandwidth used when service A is provided in the area A-1-0 is 20 Gbps including an NW bandwidth between the area A-1-0 and the area A-1-α, and the maintenance and operation costs are the same in the MEC servers group in the respective areas. Further, the default value $F_{th1}$ is set to 180.

It is assumed that the cluster configuration appropriateness F of Example 1 is calculated using a calculation formula shown in Formula 1 below. It is noted that the following calculation formula is an example, and the calculation formula for the cluster configuration appropriateness F, and the elements, the coefficient, and the like to be included in the calculation can be arbitrarily set as described above.

$$F = \sum_i (80 - x_i) + \frac{1000}{y} \quad (0 < x_i < 80, \; 0 < y) \quad \text{[Formula 1]}$$

$$y = \sum_{h,i} n_{h,i} \frac{C_{h,i}}{C_h}$$

F: Appropriateness of the cluster configuration (arb. unit)

$x_i$: Percentage (%) of CPU usage rate in area i when cluster is configured (normalized with 100% as a maximum value)

y: Expected value (Gbps) of NW bandwidth usage rate at the time of cluster configuration $n_{h,i}$: Amount of NW bandwidth (Gbps) required to provide service h in area i $C_h$: CPU usage rate (%) required to provide service h $C_{h,i}$: CPU usage rate (%) in service h in area i FIG. 5 illustrates a functional block diagram of the clustering system according to Example 1, and FIG. 6 illustrates a clustering sequence chart. A flowchart of the cluster planning unit is illustrated in FIG. 7. In FIGS. 5 to 7, the same elements as those in FIGS. 2 to 4 described above are designated by the same reference signs and the description thereof will be omitted.

Figure 6:
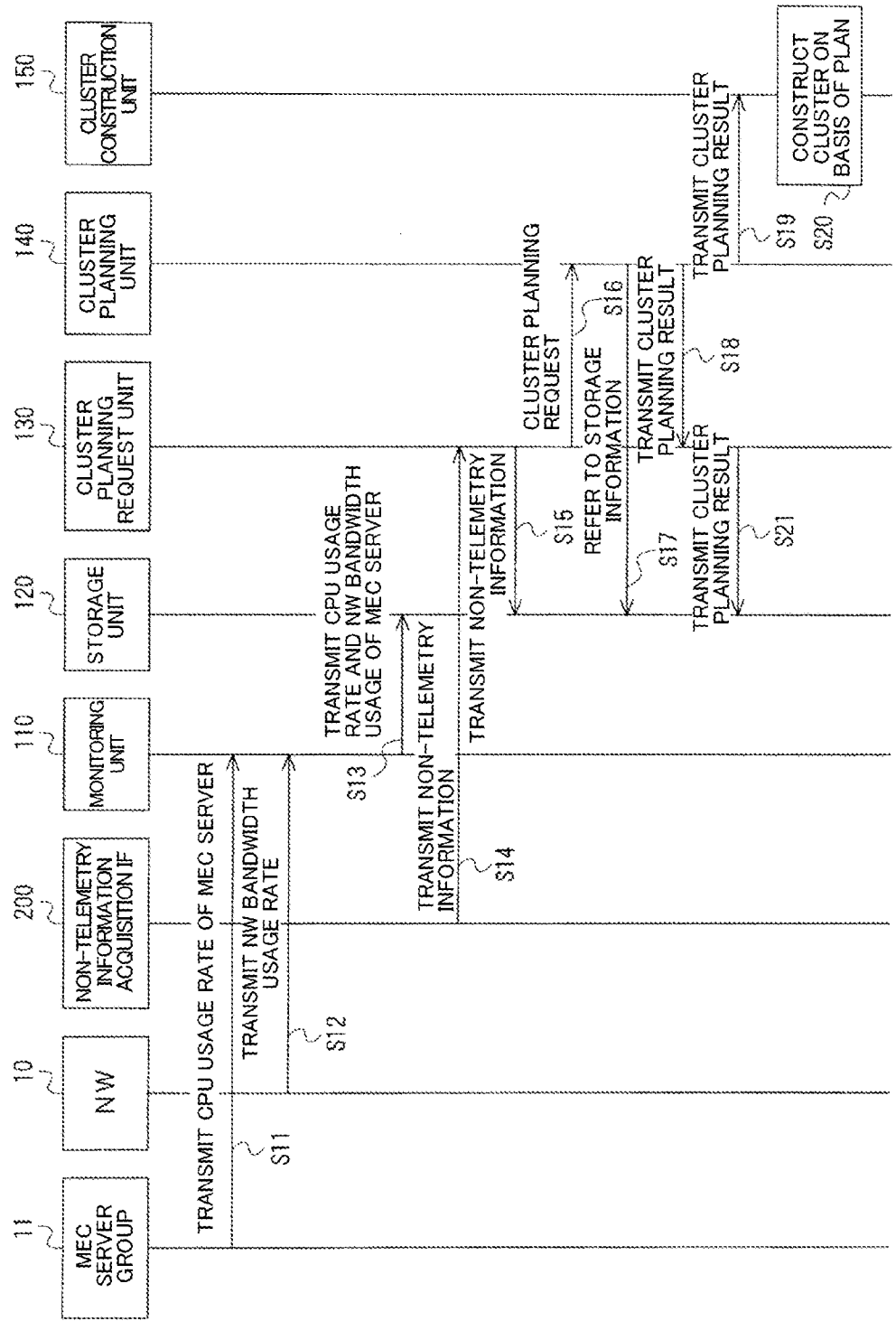
FIG. 6 is a clustering sequence chart according to Example 1.
Figure 7:
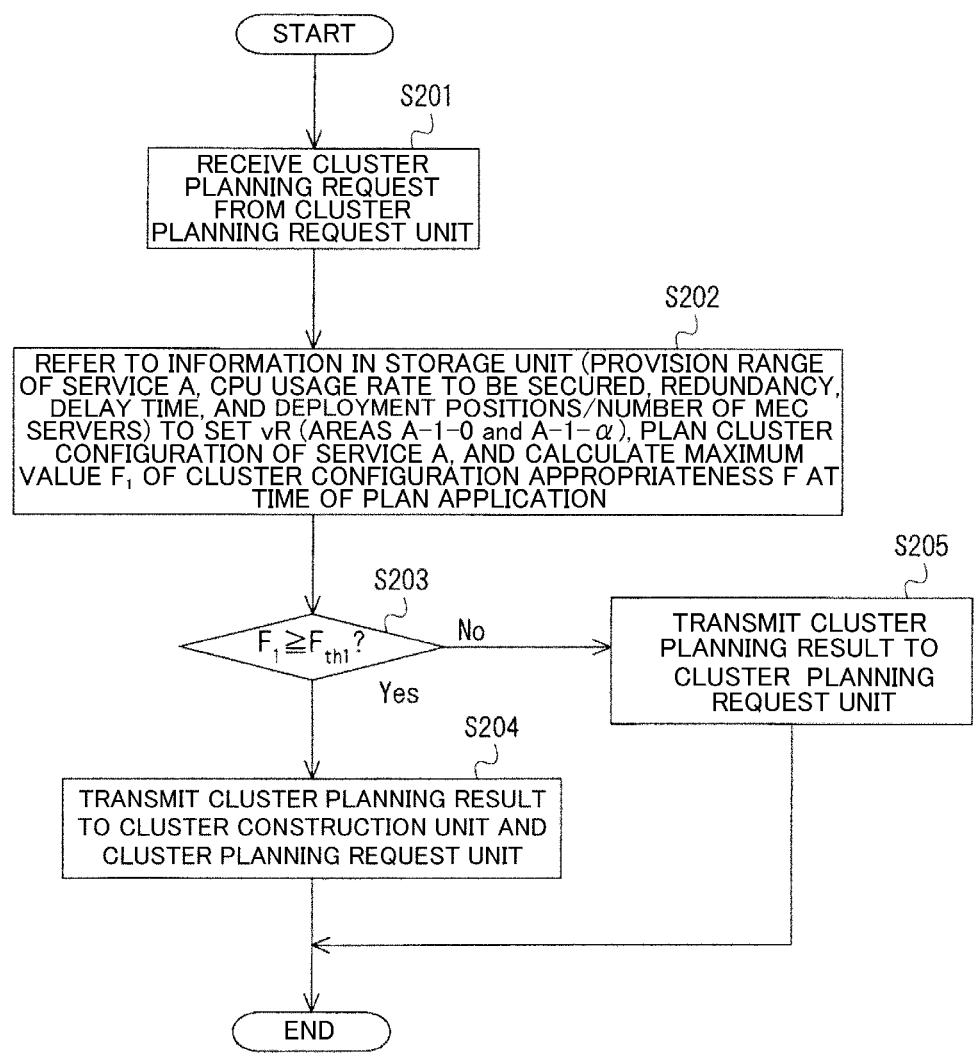
FIG. 7 is a flowchart of a cluster planning unit according to Example 1.

The cluster planning request unit 130 transmits the cluster planning request to the cluster planning unit 140 when a need to provide service A occurs (step S17 in FIG. 6). When the cluster planning unit 140 receives the cluster planning request from the cluster planning request unit 130 (step S201 in FIG. 7), the cluster planning unit 140 refers to the provision range of service A, the CPU usage rate to be secured, the redundancy, the delay time, and the deployment positions/number of MEC servers stored in the storage unit 120 to set the virtual region vR (a region including areas A-1-0 and A-1-α in the present example), plans the cluster configuration of service A, and calculates the maximum value $F_1$ of the cluster configuration appropriateness F at the time of plan operation (step S202 in FIG. 7). Here, as an example, the cluster configuration appropriateness F is calculated for the following three proposals that can be considered as the cluster configuration proposals.

Proposal 1: Secure 400% of the CPUs in area A-1-0. F=185.

Proposal 2: Secure 200% of the CPUs in area A-1-0 and 200% of the CPUs in area A-1-α. F=189.

Proposal 3: Secure 400% of the CPUs in area A-1-α. F=210.

Since the maximum value $F_1$ of the cluster configuration appropriateness F=210>the default value $F_{th1}$, the cluster planning unit 140 transmits proposal 3 to the cluster construction unit 150 and the cluster planning request unit 130 (steps S203 to S204 in FIG. 7), and the cluster construction unit 150 performs clustering on the basis of proposal 3 (step S20 in FIG. 6). The cluster planning request unit 130 stores proposal 3 in the storage unit (step S21 in FIG. 6).

Thus, it is possible to efficiently use or operate resources having properties different for each MEC server group 11 such as the MEC server group 11 having a hierarchical structure, and having physical restrictions while satisfying requirements of service A.

Further, by setting the virtual region vR in consideration of the operator side, it is possible to provide service A in a state in which the requirements are satisfied without specifically designating an area division and a region of the server to be clustered when service A is used.

Further, since the provision of service A according to proposal 3 means that a resource demand of the area A-1-α will also be present in the future, this can be reflected in a resource increase plan for the area A-1-α.

Example 2

Next, Example 2 of the present invention will be described with reference to FIG. 8. In Example 2, an example in which, in Example 1, a cluster of service B (provision range: area A-1-α, CPU usage rate to be secured: 200%, redundancy: double, and a delay time: 8 ms) is configured in an environment in which service A is provided, and the cluster configuration to be applied to the MEC server group is updated as necessary is shown.

Here, an NW bandwidth used when service B is provided in the area A-1-α is set to 30 Gbps. Further, the default value $F_{th1}$ is set to 180, and the lower limit value $F_{th2}$ is set to 80.

Figure 8:
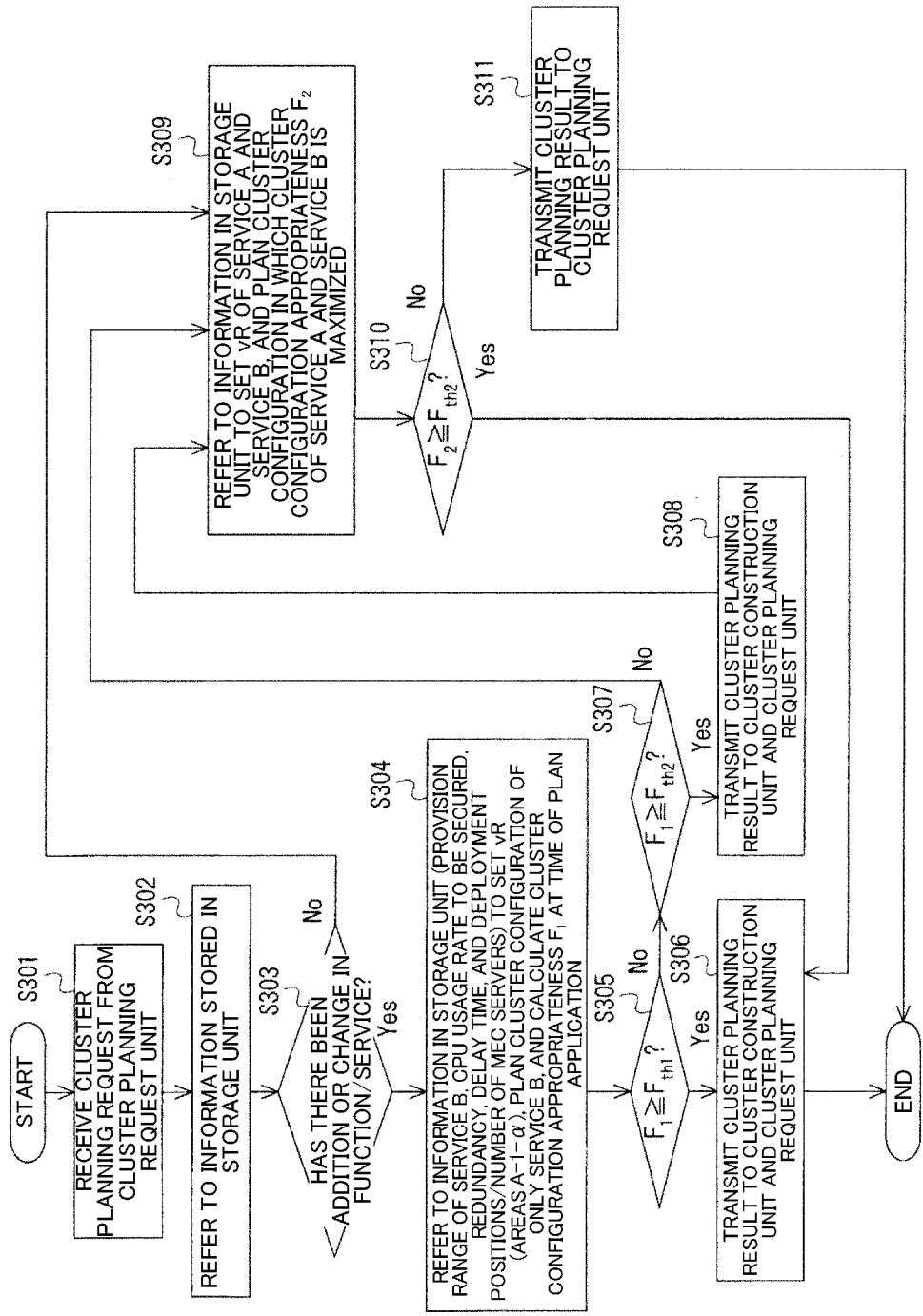
FIG. 8 is a flowchart of a cluster planning unit according to Example 2.

FIG. 8 illustrates a flowchart of the cluster planning unit according to Example 2.

The cluster planning request unit 130 transmits the cluster planning request to the cluster planning unit 140 when a need to provide service B occurs. When the cluster planning unit 140 receives the cluster planning request from the cluster planning request unit 130 (step S301 in FIG. 8), the cluster planning unit 140 refers to the provision range of service B, the CPU usage rate to be secured, the redundancy, the delay time, and the deployment position/number of MEC servers stored in the storage unit 120 to set the virtual region vR (area A-1-α in the present example), plans the cluster configuration of service B, and calculates the maximum value $F_1$ of the cluster configuration appropriateness F at the time of plan operation (steps S302 to S304 in FIG. 8).

Here, it is assumed that the maximum value $F_1$ of the calculated cluster configuration appropriateness F<lower limit value $F_{th2}$, that is, "no solution" (steps S305 and S307 in FIG. 8). This is because the CPU usage rate in the area A-1-α exceeds an upper limit, which means that clustering is not possible when only service B is considered. Therefore, the cluster planning unit 140 refers to the information stored in the storage unit 120 to reconsider the cluster configuration for service A as well. That is, the virtual region vR is set for each of service A and service B (in the present example, a region consisting of areas A-1-0 and A-1-α), and the cluster configuration of the MEC server group 11 belonging to the virtual region vR is planned, and the maximum value $F_2$ of the cluster configuration appropriateness F at the time of plan operation is calculated (step S309 in FIG. 8). Here, as an example, the cluster configuration appropriateness F is calculated for the following three proposals that can be considered as the cluster configuration proposals.

TABLE 1

|  | Service A | Service B |
|---|---|---|
| Proposal 1 (F = 93) | | |
| CPU to be secured in area A-1-0 | 160% | 0% |
| CPU to be secured in area A-1-α | 240% | 400% |
| Proposal 2 (F = 95) | | |
| CPU to be secured in area A-1-0 | 200% | 0% |
| CPU to be secured in area A-1-α | 200% | 400% |
| Proposal 3 (F = 105) | | |
| CPU to be secured in area A-1-0 | 400% | 0% |
| CPU to be secured in area A-1-α | 0% | 400% |

Since the maximum value $F_2$ of the cluster configuration appropriateness F=105>lower limit value $F_{th2}$, the cluster planning unit 140 transmits proposal 3 to the cluster construction unit 150 and the cluster planning request unit 130 (steps S310 and S03 to S306 in FIG. 8), and the cluster construction unit 150 performs clustering on the basis of proposal 3. The cluster planning request unit 130 stores proposal 3 in the storage unit.

Thus, it is possible to efficiently use or operate resources having properties different for each MEC server group 11 such as the MEC server group 11 having a hierarchical structure, and having physical restrictions while satisfying requirements of services A and B.

Further, by setting the virtual region vR in consideration of the operator side, it is possible to provide services A and B in a state in which the requirements are satisfied without specifically designating an area division and a region of the server to be clustered when services A and B are used.

Further, since the provision of services A and B according to proposal 3 means that a resource demand of area A-1-0 and area A-1-α, especially, area A-1-α will also be present in the future, this can be reflected in a resource increase plan for area A-1-0 and area A-1-α, especially, area A-1-α.

Example 3

Next, Example 3 of the present invention will be described. In Example 3, an example in which not only the CPU usage rate or the NW usage bandwidth of the MEC server at the time of configuration of cluster as in Example 1 is considered when the cluster configuration appropriateness F is calculated, but also the maintenance and operation costs of the MEC server group 11 is considered is shown.

The formula for calculating the cluster configuration appropriateness F in Example 3 is shown as Formula 2 below.

$$F = \sum_i (80 - x_i) + \frac{1000}{y} + \frac{1000}{z} (0 < x_i < 80, \ 0 < y, z) \quad \text{[Formula 2]}$$

$$y = \sum_{h,i} n_{h,i} \frac{C_{h,i}}{C_h}$$

$$z = a + b$$

F: Appropriateness of the cluster configuration (arb. unit)
$x_i$: Percentage (%) of CPU usage rate in area i when cluster is configured (normalized with 100% as a maximum value)
y: Expected value (Gbps) of NW bandwidth usage rate at the time of cluster configuration
$n_{h,i}$: Amount of NW bandwidth (Gbps) required to provide service h in area i
$C_h$: CPU usage rate (%) required to provide service h
$C_{h,i}$: CPU usage rate (%) in service h in area i
z: Maintenance and operation costs (arb. unit)
a: Physical distance (km) between the MEC server group farthest from a maintenance base among the MEC server groups in use and the maintenance base
b: Number of days (days) until the next regular maintenance of the MEC server group of which the next regular maintenance is the earliest among the MEC server groups in use In Example 3, the physical distance a (km) between the MEC server group 11 farthest from the maintenance base among the MEC server groups 11 in use and the maintenance base, and the number of days b (days) until the next regular maintenance of the MEC server group 11 of which the next regular maintenance is the earliest among the MEC server groups 11 in use are considered as the maintenance and operation costs. In addition to these, it is also possible to reflect, in the calculation formula, costs relevant to maintenance and operation including an increase in resources, such as service life of the MEC servers, resource tightness, the number of employees at each maintenance base, road maintenance status, and weather conditions. Elements or coefficients to be included as costs regarding the maintenance and operation, for example, can be set arbitrarily.

The distance a is considered in order to reflect an amount of increase in cost at the time of occurrence of temporarily occurring urgent maintenance or resource increase work in addition to regular maintenance or resource increase work, and the number of days b is considered in order to reflect a likelihood of occurrence of temporary maintenance until the next regular maintenance in the maintenance and operation costs.

Here, in the NW configuration illustrated in FIG. 1, when the cluster configuration appropriateness F is calculated using the calculation formula shown in Formula 2 for proposals 1, 2 and 3 of Example 1 on the assumption that respective physical distances from the maintenance base to the MEC server group areas A-1-0 and A-1-α are 5 km and 50 km, and the number of days until the next regular maintenance is 10 days and 20 days for the MEC server group areas A-1-0 and A-1-α, the cluster configuration appropriateness F becomes 252, 203, and 224, respectively, and service A is clustered according to proposal 1.

Thus, it is possible to efficiently use resources having properties different for each MEC server group 11 such as the MEC server group 11 having a hierarchical structure, and having physical restrictions while satisfying requirements of service A, in consideration of the maintenance and operation costs.

Example 4

Next, Example 4 of the present invention will be described. In Examples 1 to 3, the virtual region vR is created according to requirements such as a provision range and a delay time of a new function/service at the time of provision of the new function/service. On the other hand, in Example 4, an example in which a plurality of virtual regions vR are set in advance from a delay time requirement as a requirement that can be satisfied and a status of resources such as the MEC server group 11 or the NW 10 is shown.

Deployment positions and deployment number of the MEC servers, a topology and bandwidth of the NW 10, and a delay time between the MEC server and the terminal 1 present in a range in which a function/service is provided by the MEC server are stored as resource information in the storage unit 120 of the clustering system 100. On the other hand, a provision range and requirements, and a construction status of a cluster created by the cluster planning unit 140 and constructed by the cluster construction unit 150 are stored as information on the function/service that is provided to the terminal 1. These pieces of information may be updated at the time of occurrence of change from stored pieces of information via the non-telemetry information acquisition IF or may be updated regularly. Further, a current usage status of the MEC server and the NW 10 and a provision status of provided functions/services are also stored at any time.

The cluster planning unit 140 refers to the information stored in the storage unit 120 to create the virtual region vR that changes at any time in a situation at that time for each provision range and delay time requirement, and regularly updates the virtual region vR. Although an example in which the virtual region vR is created according to the requirements of the provision range and the delay time of service A at the time of the provision of service A is shown in Example 1, the virtual region vR may be created for each provision range and delay time requirement of the functions/services in advance as in Example 4, and the cluster planning request may be caused to be issued to the cluster planning request unit 130 through a selection of an option of a region including a default virtual region vR at the time of using the function/service.

Further, resource information of another edge/cloud business operator may be stored in the storage unit 120 via the non-telemetry information acquisition IF, and a virtual region vR including the other edge/cloud server may be created using information in a range that can be ascertained by a business operator using a system, and updated regularly.

Information required to set the virtual region vR is collected through a general network management function or function/service management function, and is mounted by incorporating the system of the present invention including a mechanism for setting the virtual region vR into a general orchestration function for providing functions/services. Further, an interface that allows the provision range and requirements of a function/service to be input or the option of the region including the default virtual region vR to be selected is added to an interface such as general web for allowing a function/service to be used, and is linked with the orchestration function into which the system of the present invention including the mechanism of setting the virtual region vR has been incorporated, thereby mounting a cluster planning and constructing function based on the virtual region vR.

An embodiment of the present invention has been described in detail above, but the present invention is not limited thereto. For example, specific information of the telemetry information or the non-telemetry information shown in the above embodiment is an example, and other information can be used.

REFERENCE SIGNS LIST

1 Terminal
10 Network
11 MEC server group
100 Clustering system
110 Monitoring unit
120 Storage unit
130 Cluster planning request unit
140 Cluster planning unit
150 Cluster construction unit

The invention claimed is:

1. A clustering system that configures a cluster for provision of services to a terminal using a plurality of multi-access edge computing (MEC) servers in a network in which MEC servers are deployed at each of a plurality of geographically different bases, a network topology between the different bases includes a hierarchical structure, the clustering system comprising one or more hardware devices configured to execute stored computer programs for implementing units comprising:
   a monitoring unit configured to:
      monitor a respective CPU usage rate for each of the MEC servers and a network bandwidth usage rate of the network; and
      store telemetry information including at least the CPU usage rates and the network bandwidth usage rate acquired by the monitoring in a storage unit;
   a cluster planning request unit configured to:
      acquire non-telemetry information including at least (i) information on a provision area of services required from the cluster, (ii) information on CPU, redundancy and delay requirements of the services required from the cluster, and (iii) information on deployment positions and numbers of the MEC servers;
      store the non-telemetry information in the storage unit; and
      generate a cluster planning request on a basis of the non-telemetry information;
   a cluster planning unit configured to:
      set a virtual region including a subset of the plurality of geographically different bases satisfying the provision area, the CPU requirements of the required services, the redundancy requirements of the required services, and the delay requirements of the required services on a basis of the telemetry information and the non-telemetry information in the storage unit in response to the cluster planning request; and
      determine a cluster plan for providing the services from a plurality of MEC servers deployed at the base belonging to the set virtual region, wherein the cluster plan is determined based at least on (i) a CPU usage rate in each of the subset of bases, (ii) a network bandwidth requirement for each of the required services in each of the plurality of bases, and (iii) a required CPU usage rate for each of the required services in each of the subset of bases; and
   a cluster construction unit configured to performing a clustering process to configure the cluster for provisioning the required services on a basis of the cluster plan.

2. The clustering system according to claim 1, wherein, when the cluster planning unit cannot calculate the cluster plan of the cluster satisfying the provision area and requirements of the services, the cluster planning unit calculates a cluster plan including other services being provided, in addition to the services.

3. The clustering system according to claim 1, wherein the non-telemetry information further includes maintenance and operation cost information.

4. The clustering system according to claim 1, wherein the cluster planning unit presets a plurality of virtual regions in advance and calculates a cluster plan using a virtual region selected by an interface for selecting one of the plurality of virtual regions.

5. The clustering system according to claim 1, wherein the monitoring unit, the cluster planning request unit, the cluster planning unit, and the cluster construction unit are mounted for an orchestration function for providing services.

6. The clustering system according to claim 1, wherein the cluster planning unit calculates a plurality of cluster plan proposals for providing services from a plurality of MEC servers deployed at the bases belonging to the set virtual region, calculates a cluster configuration appropriateness parameter for each cluster plan proposal, selects one of the cluster plan proposals on a basis of the calculated cluster configuration appropriateness parameter, and adopts the selected cluster plan proposal as the cluster plan.

7. A clustering method for configuring, by a clustering system comprising one or more hardware devices configured to execute stored computer programs, a cluster for provision of services to a terminal using a plurality of multi-access edge computing (MEC) servers in a network in which MEC servers are deployed at each of a plurality of geographically different bases, a network topology between the different bases includes a hierarchical structure, the clustering method comprising:
- monitoring, by a monitoring unit of the clustering system, a respective CPU usage rate for each of the MEC servers and a network bandwidth usage rate of the network and store telemetry information including at least the CPU usage rates and the network bandwidth usage rate acquired by the monitoring in a storage unit;
- acquiring, by a cluster planning request unit of the clustering system, non-telemetry information including at least (i) information on a provision area of services required from the cluster, (ii) information on CPU, redundancy and delay requirements of the services required from the cluster, and (iii) information on deployment positions and numbers of the MEC servers, store the non-telemetry information in the storage unit, and generate a cluster planning request on a basis of the non-telemetry information;
- setting, by a cluster planning unit of the clustering system, a virtual region including a subset of the plurality of geographically different bases satisfying the provision area, the CPU requirements of the required services, the redundancy requirements of the required services, and the delay requirements of the required services on a basis of the telemetry information and the non-telemetry information in the storage unit in response to the cluster planning request, and determining a cluster plan for providing the services from a plurality of MEC servers deployed at the base belonging to the set virtual region, wherein the cluster plan is determined based at least on (i) a CPU usage rate in each of the subset of bases, (ii) a network bandwidth requirement for each of the required services in each of the subset of bases, and (iii) a required CPU usage rate for each of the required services in each of the plurality subset of bases; and
- performing, by a cluster construction unit of the clustering system, a clustering process to configure the cluster for provisioning the required services on a basis of the cluster plan.

8. The clustering system of claim 1, wherein the cluster plan is determined based at least on (i) the CPU usage rate in each of the plurality of bases and (ii) an expected network bandwidth usage rate, wherein the expected network bandwidth usage rate is computed as $$y = \sum_{h,i} n_{h,i} \frac{C_{h,i}}{C_h}$$

wherein $n_{h,i}$ is the network bandwidth requirement for the $h^{th}$ required service in the $i^{th}$ base, $C_{h,i}$ is the required CPU usage rate for the $h^{th}$ required service in the $i^{th}$ base, and $C_h$ is a required CPU usage rate for the $h^{th}$ required service.

* * * * *